US008521145B2

(12) United States Patent
Isaksson et al.

(10) Patent No.: US 8,521,145 B2
(45) Date of Patent: Aug. 27, 2013

(54) SOFTWARE DISTRIBUTION BETWEEN RADIO BASE STATIONS

(75) Inventors: Niklas Isaksson, Mölnlycke (SE); Magnus Standar, Floda (SE); Andreas Olsson, Stockholm (SE); Per Ståhle, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 478 days.

(21) Appl. No.: 12/811,597

(22) PCT Filed: Jan. 8, 2008

(86) PCT No.: PCT/SE2008/050018
§ 371 (c)(1),
(2), (4) Date: Jul. 2, 2010

(87) PCT Pub. No.: WO2009/088327
PCT Pub. Date: Jul. 16, 2009

(65) Prior Publication Data
US 2010/0291914 A1    Nov. 18, 2010

(51) Int. Cl.
*H04M 3/00* (2006.01)

(52) U.S. Cl.
USPC .......................................................... 455/418

(58) Field of Classification Search
USPC ............... 455/418, 419, 422.1, 423, 424, 561
See application file for complete search history.

(56) References Cited

U.S. PATENT DOCUMENTS

| 6,141,683 | A | 10/2000 | Kraml et al. |
|---|---|---|---|
| 6,799,037 | B1 | 9/2004 | Mielke et al. |
| 7,190,952 | B2 * | 3/2007 | Okita et al. ................. 455/418 |
| 7,647,039 | B2 | 1/2010 | Okita et al. |
| 7,853,609 | B2 | 12/2010 | Dehghan et al. |
| 8,214,470 | B2 | 7/2012 | Quilty |
| 2002/0075824 | A1 | 6/2002 | Willekes et al. |
| 2003/0140339 | A1 | 7/2003 | Shirley et al. |
| 2004/0203810 | A1 | 10/2004 | Virtanen et al. |
| 2004/0216099 | A1 | 10/2004 | Okita et al. |
| 2005/0111484 | A1 | 5/2005 | Obata |
| 2005/0186952 | A1 | 8/2005 | Kitajima |
| 2005/0208944 | A1 | 9/2005 | Okita et al. |

(Continued)

FOREIGN PATENT DOCUMENTS

| EP | 1429569 A1 | 6/2004 |
|---|---|---|
| EP | 1 575 244 A2 | 9/2005 |
| EP | 1 727 312 A1 | 11/2006 |
| WO | WO 2008/011149 A2 | 1/2008 |

OTHER PUBLICATIONS

U.S. Appl. No. 11/939,990, filed Nov. 14, 2007; Inventor: Quilty.

(Continued)

*Primary Examiner* — Temica M Beamer
(74) *Attorney, Agent, or Firm* — Nixon & Vanderhye, P.C.

(57) ABSTRACT

A method of operating a telecommunications network (20, 20') comprises detecting an insufficient software situation for a target radio base station (28); a software source server (36) authorizing obtention of satisfactory software for the target radio base station from a source radio base station; and, the target radio base station obtaining the satisfactory software from the source radio base station. In example embodiments, the insufficient software situation can be either a missing software situation or an upgrade-required software situation.

12 Claims, 5 Drawing Sheets

(56) References Cited

U.S. PATENT DOCUMENTS

| | | | |
|---|---|---|---|
| 2006/0030325 | A1 | 2/2006 | Okita et al. |
| 2008/0084855 | A1 | 4/2008 | Rahman |
| 2008/0233943 | A1 | 9/2008 | Okita et al. |
| 2008/0320464 | A1 | 12/2008 | Wahlstrom et al. |
| 2010/0291914 | A1 | 11/2010 | Isaksson et al. |

OTHER PUBLICATIONS

Birkedal et al, "Experiences of Operating a Pre-Commercial WCDMA Network", Ericsson Review No. 2, 2002, pp. 50-61.
International Search Report and Written Opinion mailed Oct. 30, 2008 in corresponding PCT application PCT/SE2008/050045.
International Preliminary Report on Patentability mailed May 14, 2010 in corresponding PCT Application No. PCT/SE2008/050045.
Office Action mailed Aug. 30, 2011 in co-pending U.S. Appl. No. 11/939,990.
International Search Report for PCT/SE2008/050018, mailed Nov. 5, 2008.
3GPP TS 36.420, V10.1.0, $3^{rd}$ Generation Partnership Project; Technical Specification Group Radio Access Network; Evolved Universal Terrestrial Radio Access Network (E-UTRAN); X2 general aspects and principles (Release 10) (Dec. 2010).
3GPP TS 36.421, V10.0.0, $3^{rd}$ Generation Partnership Project; Technical Specification Group Radio Access Network; Evolved Universal Terrestrial Radio Access Network (E-UTRAN); X2 layer 1 (Release 10) (Dec. 2010).
3GPP TS 36.422, V10.0.0, $3^{rd}$ Generation Partnership Project; Technical Specification Group Radio Access Network; Evolved Universal Terrestrial Radio Access Network (E-UTRAN); X2 signalling transport (Release 10) (Dec. 2010).
3GPP TS 36.423, V10.0.0, $3^{rd}$ Generation Partnership Project; Technical Specification Group Radio Access Network; Evolved Universal Terrestrial Radio Access Network (E-UTRAN); X2 application protocol (X2AP) (Release 10) (Dec. 2010).
3GPP TS 36.424, V10.0.0, $3^{rd}$ Generation Partnership Project; Technical Specification Group Radio Access Network; Evolved Universal Terrestrial Radio Access Network (E-UTRAN); X2 data transport (Release 10) (Dec. 2010).
3GPP TS 36.413, V8.0.0, $3^{rd}$ Generation Partnership Project; Technical Specification Group Radio Access Network; Evolved Universal Terrestrial Access Network (E-UTRAN); S1 Application Protocol (S1Ap) (Release 8) (Dec. 2007).
3GPP TS 32.102, V9.0.0, $3^{rd}$ Generation Partnership Project; Technical Specification Group Services and System Aspects; Telecommunication Management; Architecture (Release 9) (Dec. 2009).
3GPP TS 36.423, V8.0.0, $3^{rd}$ Generation Partnership Project; Technical Specification Group Radio Access Network; Evolved Universal Terrestrial Radio Access Network (E-UTRAN); X2 application protocol (X2AP) (Release 8) (Dec. 2007).

\* cited by examiner

SOFTWARE DISTRIBUTION BETWEEN RADIO BASE STATIONS

This application is the U.S. national phase of International Application No. PCT/SE2008/050018, filed 8 Jan. 2008, which designated the U.S. and is hereby incorporated by reference.

BACKGROUND

I. Technical Field

This invention pertains to telecommunications, and particularly to the supply (e.g., initial or replacement) of software at nodes of a radio access network (RAN).

II. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network providing wideband code division multiple access for user equipment units (UEs). The Third Generation Partnership Project (3GPP or "3G") has undertaken to evolve further the predecessor technologies, e.g., GSM-based and/or second generation ("2G") radio access network technologies Long Term Evolution (LTE) is a variant of a 3GPP radio access technology wherein the radio base station nodes are connected directly to a core network rather than to radio network controller (RNC) nodes. In LTE, in general functions of a radio network controller (RNC) node are performed by the radio base stations nodes. As such, the radio access network (RAN) of an LTE system has an essentially "flat" architecture comprising radio base station nodes without reporting to radio network, controller (RNC) nodes.

FIG. 1 illustrates a radio access network (RAN) environment which serves to illustrate, in consolidated fashion, the 3G, LTE, and 2G radio access technologies. The left portion of FIG. 1 provides a depiction of a 3G radio access situation in which a radio base station or NobeB is connected, to an radio network controller (RNC) in the radio access network (RAN), and the radio network controller (RNC) is connected to a SGSN node in the core network. The center portion of FIG. 1 provides a depiction of a LTE radio access situation in which a radio base station or eNodeB is connected to a access gateway (aGW) in the core network. The right portion of FIG. 1 provides a depiction of a 2G radio access situation in which a radio base station or base station transceiver is connected to base station controller (BCS) in the radio access network (RAN), and the base station controller (BCS) is connected to a SGSN node in the core network.

Typically, software and licenses germane to mobile network operation (e.g., operation of a radio access network (RAN)) are distributed to network elements from software and license server(s). In order to ease operation, these server(s) are generally centralized to operation centers, as shown in FIG. 1. Whenever a network element is to be upgraded with new software or a new license, the new software or license is downloaded from the software and license server(s). Within a mobile network the bulk of nodes requiring software update and/or distribution are typically the network elements delivering radio coverage, i.e. NodeB, eNodeB and BTS.

A trend in mobile network (e.g., radio access network (RAN)) operation is to minimize the number of nodes user traffic has to hop through before reaching the destination, either the B-part in a conversation or a service provider (if the call is an IP based call). As a consequence of this and other considerations, more functionality is transferred to the borders of the mobile network, in LTE to the gateways (GWs) and to the eNodeB. With this functional transfer to border nodes also comes more complex software and more licenses to distribute. Generally, the more complex the software, the more frequent are the software updates. As the eNodeB is a radio coverage delivering node, thus a bulk node, delivery of software from a central software server imposes a significant load increase on the central software servers.

Typically a radio base station is updated through the use of an Operational Support System (OSS). Through its Operational Support System (OSS) the operator typically selects the nodes to be updated from a list and initiates the upgrade of those nodes. Rather than upgrading the whole network in parallel, the software upgrades for the radio base station nodes are typically implemented by groups of radio base stations. Even when the software for upgrade radio base stations is upgraded in groups, the software upgrade involves interaction of the Operational Support System (OSS) with each radio base station.

U.S. patent application Ser. No. 11/939,990, entitled "UPGRADING SOFTWARE IN RADIO BASE STATION NODES", incorporated by reference herein, describes, e.g., operating a flat radio access network by grouping plural radio base stations into clusters; designating a master radio base station for a cluster; and, using the master radio base station to initiate (essentially in parallel) software upgrade of the radio base stations comprising the cluster.

BRIEF SUMMARY

In one of its aspects, the technology involves a method of operating a telecommunications network. The method comprises detecting an insufficient software situation for a target radio base station; a software source server authorizing obtention of satisfactory software for the target radio base station from a source radio base station; and, the target radio base station obtaining the satisfactory software from the source radio base station. In example embodiments, the insufficient software situation can be either a missing software situation or an upgrade-required software situation.

In an example embodiment, the act of detecting the insufficient software situation for the target radio base station is performed by the target radio base station.

In an example embodiment, the method further comprises the target radio base station requesting, of the software source server, resolution of the insufficient software situation.

In an example embodiment, the method further comprises the software source server directing the target radio base station to obtain the satisfactory software from the source radio base station.

In an example embodiment, the method further comprises the target radio base station requesting the satisfactory software from the source radio base station over an X2-AP interface; and the source radio base station supplying the satisfactory software to the target radio base station over the X2-AP interface.

Another aspect of the technology concerns a telecommunications network comprising a software source server and plural radio base stations (including a target radio base station and a source radio base station). Upon detection of an insufficient software situation for the target radio base station, the software source server is configured to authorize obtention of satisfactory software for the target radio base station from a source radio base station. The target radio base station is configured to obtain the satisfactory software from the source radio base station. In example embodiments, the insufficient software situation can be either a missing software situation or an upgrade-required software situation.

Another aspect of the technology concerns a method of operating a telecommunications network which comprises a software source server and plural radio base stations. The method comprises the software source server downloading software and a distribution plan to a first radio base station; the first radio base station distributing the software to a second radio base station in accordance with the distribution plan; and, the second radio base station distributing the software to a third radio base station in accordance with the distribution plan.

In an example embodiment, the method further comprises the first radio base station distributing the software to a first group or radio base stations, and wherein plural members of the first group of radio base stations in turn distribute the software to at least one other radio base station.

In an example embodiment, the method further comprises the first radio base station distributing the software to a second radio base station over an X2-AP interface.

In another aspect, the technology concerns a telecommunications network comprising a software source server and plural radio base stations. The software source server is configured to download software and a distribution plan to a first radio base station. The first radio base station is configured to distribute the software to a second radio base station in accordance with the distribution plan.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
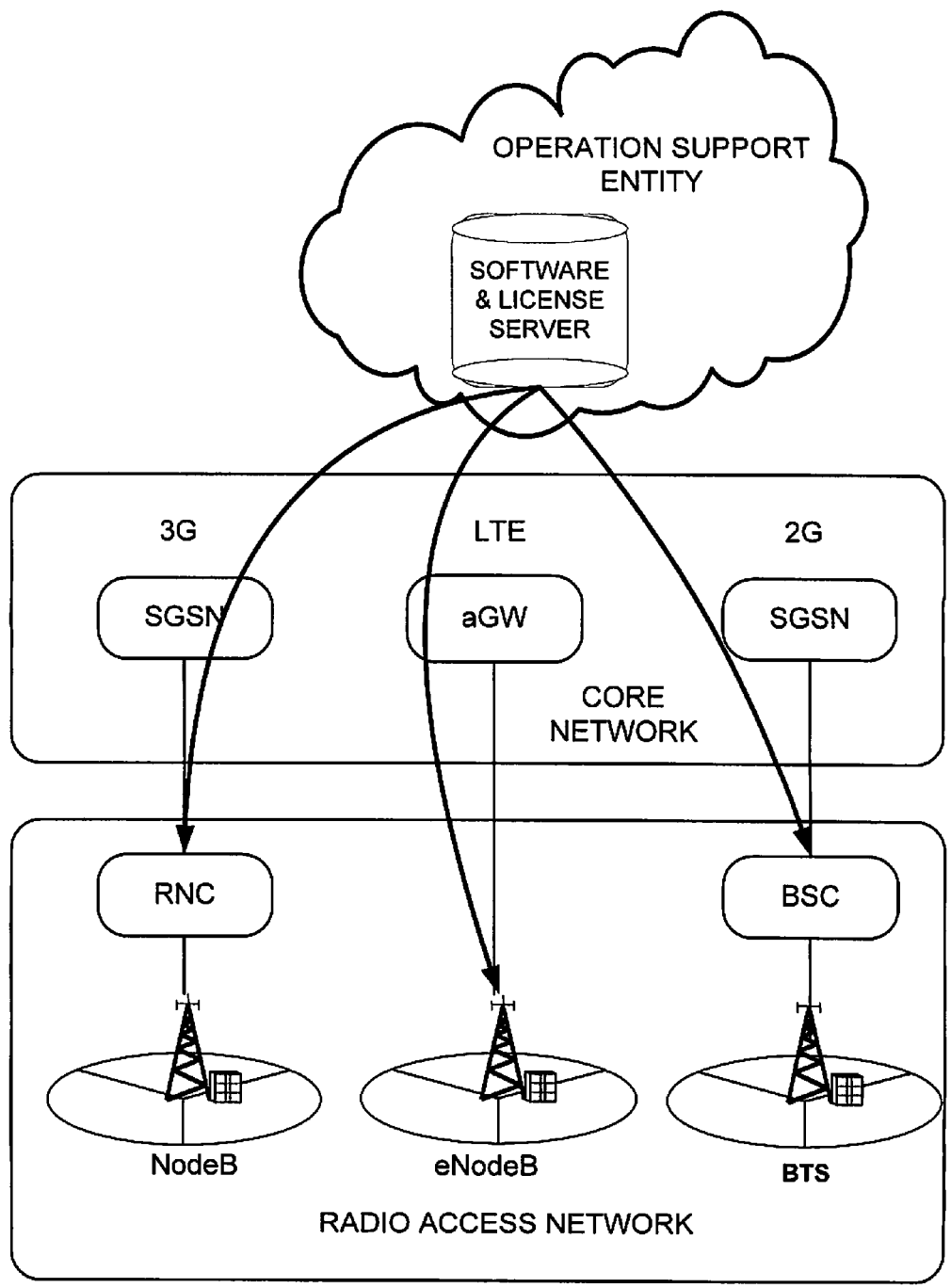
FIG. 1 is a is a diagrammatic view of a telecommunications system comprising radio access network (RAN) environment which serves to illustrate, in consolidated fashion, 3G, LTE, and 2G radio access technologies.
Figure 2:
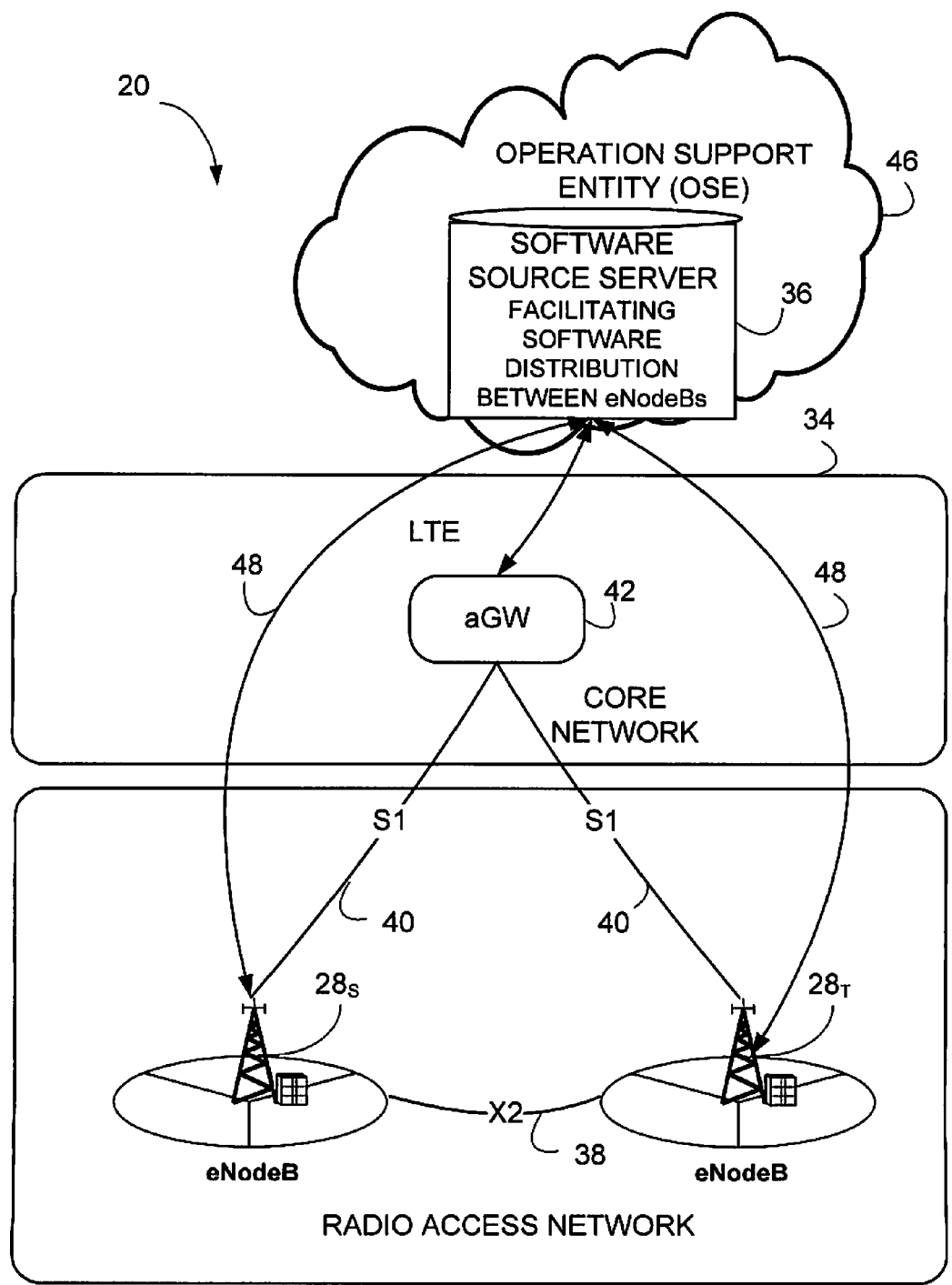
FIG. 2 is a diagrammatic view of a telecommunications system comprising a software source server which facilitates distribution of software from one radio base station to another radio base station.

FIG. 2 illustrates telecommunications system 20 which serves for illustrating example aspects of the present technology. FIG. 2 particularly illustrates telecommunications system 20 as comprising radio access network (RAN) 24 including radio base stations denominated as eNodeBs 28; core network 34; and a software source server 36.

The radio access network (RAN) 24 shown in FIG. 2 utilizes the Long Term Evolution (LTE) variant of a 3GPP radio access technology wherein the radio base station nodes (e.g., eNodeBs 28) are connected directly to a core network (rather than to an intermediate RAN node such as a radio network controller (RNC) node), and wherein general functions of a radio network controller (RNC) node are performed by the eNodeBs 28. Thus, as mentioned above, radio access network (RAN) 24 has an essentially "flat" architecture. For sake of simplicity, only two eNodeBs 28 are illustrated on FIG. 2, although it should be understood that a typical radio access network (RAN) comprises many eNodeBs.

As shown in FIG. 2, eNodeBs 28 are connected, e.g., by X2-AP link 38. The X2-AP link 38 is described, e.g., by 3GPP TS 36.423 V8.0.0 (2007-12), 3rd Generation Partnership Project; Technical Specification Group Radio Access Network; Evolved Universal Terrestrial Radio Access Network (EUTRAN); X2 application protocol (X2AP); (Release 8), which is incorporated herein by reference. Each eNodeB 28 is connected by S1 signaling link 40 to access gateway (aGW) 42 which comprises core network 34. The S1 link is described, e.g., by 3GPP TS 36.413 V8.0.0 (2007-12); 3rd Generation Partnership Project; Technical Specification Group Radio Access Network; Evolved Universal Terrestrial Access Network (E-UTRAN); S1 Application Protocol (S1AP); (Release 8), also incorporated herein by reference.

The software source server 36 can take the form of a server, data base, or any other entity capable of storing and making software available to other functional units or network elements, particularly elements of a radio access network (RAN). The software source server 36 communicates over management or Ift-B interface (depicted by arrows 48 and described by 3GPP TS 32.102) with the eNodeBs 28, as well as over Ift-G interface with access gateway (aGW) 42.

In FIG. 2 the software source server 36 is shown as being situated at operation support entity (OSE) 46. The operation support entity (OSE) 46 can be implemented as a stand alone service point, or can co-exist or cooperate with another service point or node. For example, operation support entity (OSE) 46 can reside in the operators' Network Operations Centre (NOC), normally but not exclusively as a Software Management application on the Network Management System (NMS), on the Operation Support System (OSS), or in an Element Management System (EMS) server. Preferably the operation support entity (OSE) 46 resides where it has access to the operators' file transfer protocol (FTP) servers which contain the software packages, and possibly the vendors software delivery system, for download to the FTP servers. "OSS" is terminology used for Network Management System (NMS), or a Network Domain Manager (a telecom management system sitting between the node and the NMS in place of an EMS, and has EMS functionality and some NMS functionality particular to a logical domain such as Radio Access management.

Figure 3:
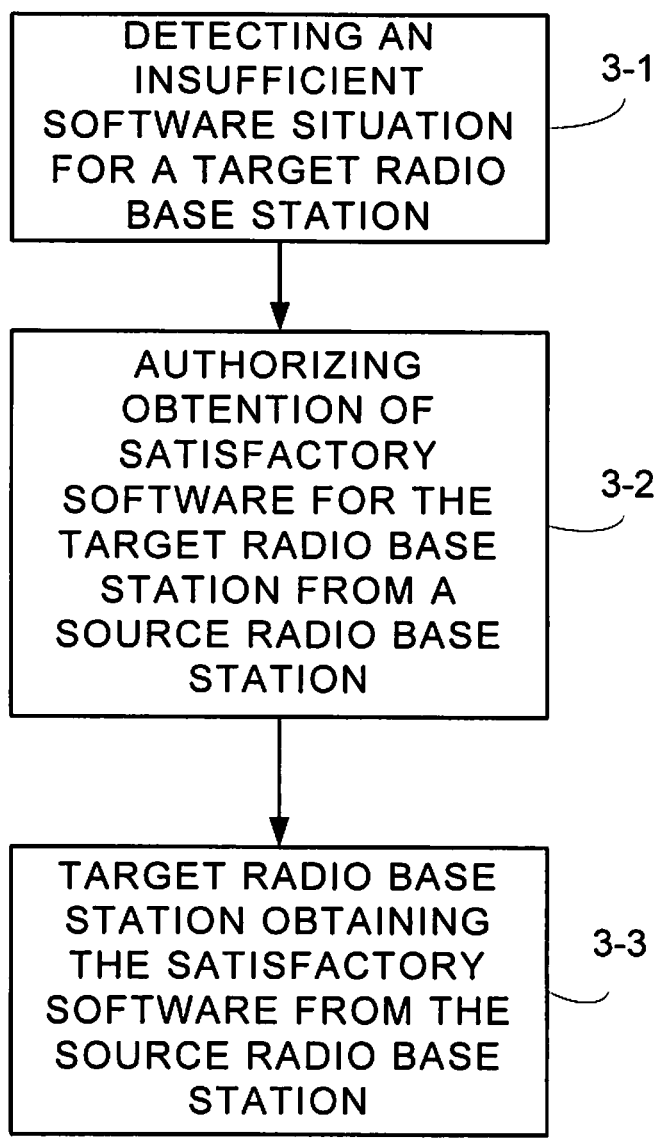
FIG. 3 is a flowchart illustrating basic, representative acts or steps included in a method of operating of distributing software from one radio base station to another radio base station.

FIG. 3 illustrates basic, representative acts or steps included in a method of operating a telecommunications network such as telecommunications system 20, and particularly a method of distributing software from one radio base station to another radio base station (e.g., from a source eNodeB $28_S$ to a target eNodeB $28_T$, such as illustrated in FIG. 2). Act 3-1 of the example method of FIG. 3 comprises detecting an insufficient software situation for a target radio base station (e.g., eNodeB $28_T$ in FIG. 2). Act 3-2 comprises software source server 36 authorizing obtention of satisfactory software for the target radio base station (e.g., eNodeB $28_T$) from a source radio base station (e.g., eNodeB $28_S$). Act 3-3 comprises the target radio base station obtaining the satisfactory software from the source radio base station.

Figure 4:
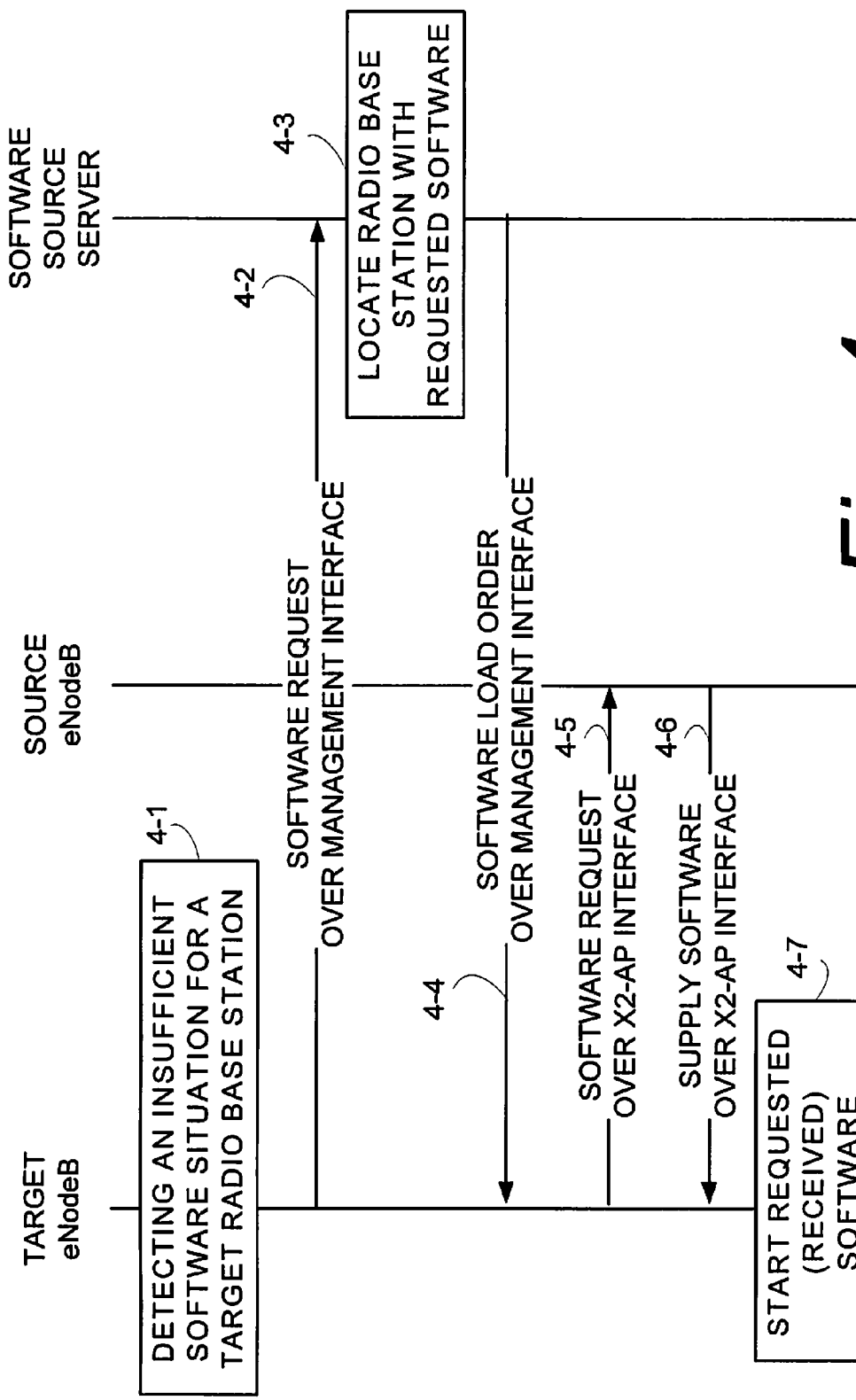
FIG. 4 is a diagrammatic view illustrating an example implementation of the method of FIG. 3.

FIG. 4 shows, in more detail, example acts or steps of an example implementation of the method of FIG. 3. Act 4-1 of the example method of FIG. 4 comprises eNodeB $28_T$ detecting its own insufficient software situation, e.g., eNodeB $28_T$ detecting an insufficient software situation for target radio base station (e.g., eNodeB $28_T$ in FIG. 2). The insufficient software situation detected by eNodeB $28_T$ can be either a missing software situation (e.g., software missing at eNodeB $28_T$) or an upgrade-required software situation (e.g., eNodeB $28_T$ requiring a software upgrade). For example, the detection of an insufficient software situation for eNodeB can commence when eNodeB $28_T$ starts up, and plug & play functionality of eNodeB $28_T$ detects missing software.

Act 4-2 of the FIG. 4 implementation method comprises eNodeB $28_T$ requesting software upgrade for the missing parts (e.g., missing software) from software source server 36 over management interface 48. Act 4-2 thus illustrates the eNodeB $28_T$ requesting, of software source server 36, resolution of the insufficient software situation. Act 4-3 shows software source server 36 locating an appropriate radio base station node that has the software requested by eNodeB $28_T$. Locating the appropriate radio base station node that has the software requested by eNodeB $28_T$ can comprise, for example, searching an appropriate database at software source server 36 or elsewhere. In the illustrated example of FIG. 2, the radio base station that has the requested software is source eNodeB $28_S$. In an example implementation, software source server 36 seeks to locate a radio base station having the requested software which is proximate to, and preferably neighboring, eNodeB $28_T$.

Upon determining that the requested software is located at source eNodeB $28_S$, as act 4-4 the software source server 36 orders eNodeB $28_T$ to load the requested software from source eNodeB $28_S$. As indicated above, source eNodeB $28_S$ is preferably but not exclusively a neighbor of eNodeB $28_T$. The load order of act 4-4 is preferably communicated by software source server 36 to eNodeB $28_T$ over management interface 48. Act 4-4 is thus an implementation example of software source server 36 authorizing obtention of satisfactory software for the target radio base station (e.g., eNodeB $28_T$) from a source radio base station (e.g., eNodeB $28_S$), and shows software source server 36 directing eNodeB $28_T$ to obtain satisfactory software from source eNodeB $28_S$.

Act 4-5 of FIG. 4 shows eNodeB $28_T$ contacting its neighbor (e.g., source eNodeB $28_S$) and requesting the missing software (e.g., the requested software) from source eNodeB $28_S$. The request message of act 4-5 is sent over the X2-AP link 38 that connects eNodeB $28_T$ and source eNodeB $28_S$. Act 4-6 shows source eNodeB $28_S$, in response to the request of act 4-5, sending (over X2-AP link 38) the requested software to eNodeB $28_T$. Then, as act 4-7, eNodeB $28_T$ starts the requested (and now newly received from source eNodeB $28_S$) software. The requested software can be started by plug and play functionality of eNodeB $28_T$. Thus, act 4-6 is an implementation example of eNodeB $28_T$ obtaining satisfactory software (e.g., the requested software) from the source radio base station.

Figure 5:
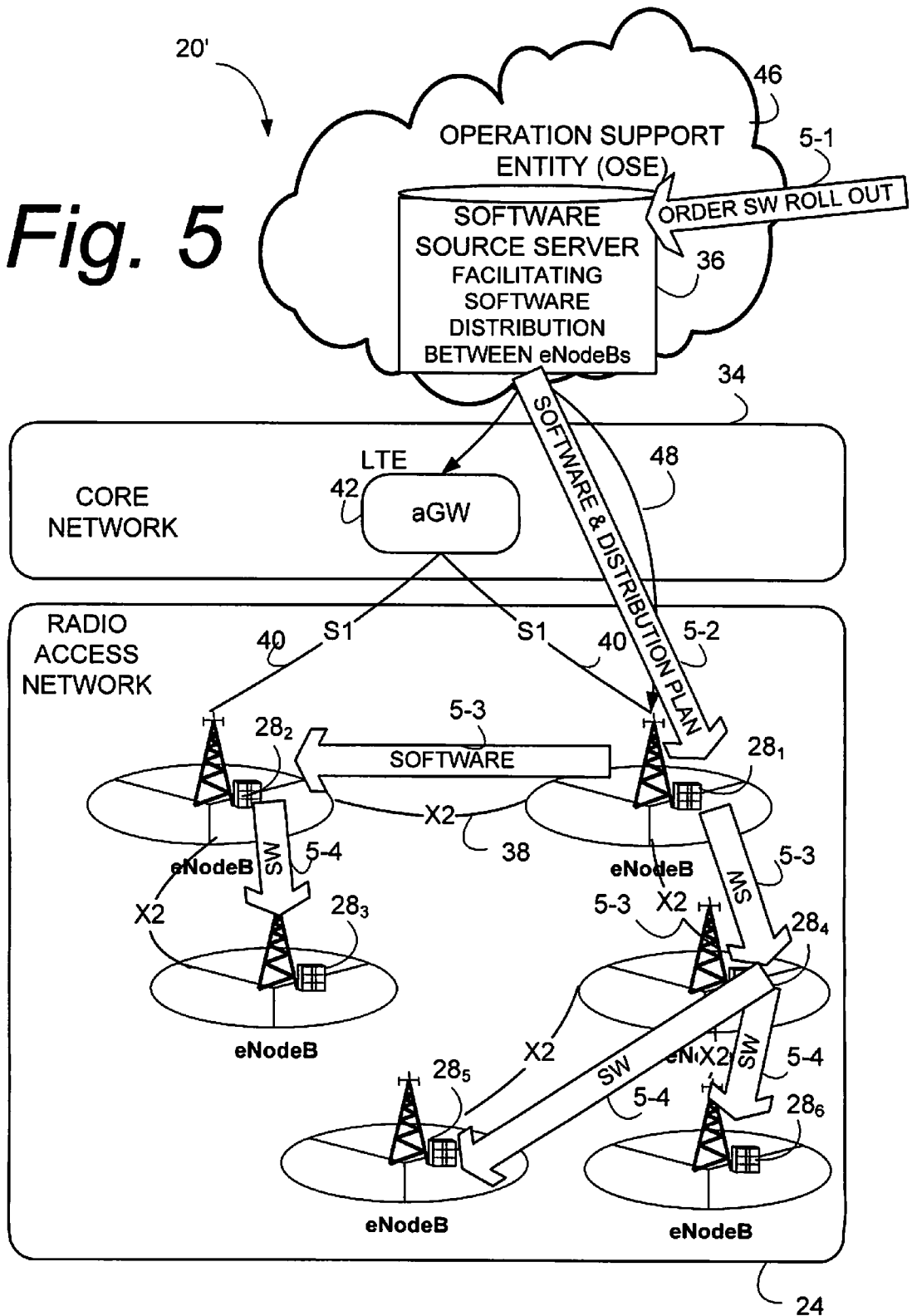
FIG. 5 is a diagrammatic view of a telecommunications system comprising a software source server which facilitates cascading distribution of software from one radio base station to another radio base station.

FIG. 5 shows another telecommunications network 20' which is similar to telecommunications network 20 of FIG. 2 in having core network 34, software source server 36, and a radio access network. However, radio access network (RAN) 24' of the FIG. 5 system is shown with additional eNodeBs 28, e.g., eNodeBs $28_1$-$28_6$. The eNodeBs 28 of the FIG. 5 system are connected to each other, e.g., via X2-AP links 38.

FIG. 4 shows that the software source server 36 does not provide sufficient software to target radio base station $28_T$ after receipt by software source server 36 of the software request of act 4-2. In other words, the target radio base station ($28_T$) obtains the satisfactory software from the source radio base station $28_S$ so that the software source server 36 does not send the satisfactory software toward the target radio base station as a result of the insufficient software situation detected as act 4-1.

In the FIG. 5 system, software source server 36 is configured to download software and a distribution plan to a first radio base station such as eNodeB $28_1$. The first radio base station eNodeB $28_1$ is configured to distribute the software to a second radio base station (such as radio base station eNodeB $28_2$ and/or $28_4$) in accordance with the distribution plan. The distribution, and thus the distribution plan, can be either cascade in linear form from one eNodeB to another eNodeB, or in tree form from one eNodeB to all the eNodeB's un-updated neighbors, or a combination of both forms.

FIG. 5 further illustrates basic, representative acts or steps included in a method of operating a telecommunications network such as telecommunications system 20', and particularly a method of distributing software from one radio base station to another radio base station (e.g., from first radio base station eNodeB $28_1$ to other eNodeBs 28 such as eNodeBs $28_2$-$28_6$ illustrated in FIG. 5). Act 5-1 of the method of FIG. 5 comprises a network operator ordering a software roll out (e.g., a distribution of new or replacement software) for eNodeBs 28 such as eNodeBs $28_1$-$28_6$ of the telecommunications network 20' of FIG. 5. As act 5-2, software source server 36 downloads the software and a distribution plan to first radio base station eNodeB $28_1$. The download of act 5-2 of the software and distribution plan occurs over management interface 48. The distribution plan orders the first radio base station eNodeB $28_1$ to distribute the software to other eNodeBs 28, and specifies the manner in which the distribution is to be accomplished. For the example illustrated scenario of FIG. 5, the distribution plan specifies that first radio base station eNodeB $28_1$ is to distribute the software in linear cascade form to a second eNodeB, e.g., to eNodeB $28_2$ as act 5-3. The distribution plan further specifies that a second eNodeB $28_2$ is (as act 5-4) to distribute the software to a third radio base station eNodeB $28_3$ in accordance with the distribution plan.

The particular example distribution plan whose implementation is shown in FIG. 5 also includes distributing the software from first radio base station eNodeB $28_1$ to eNodeB $28_4$ as another instance of act 5-3, e.g., another instance of first radio base station eNodeB $28_1$ distributing the software to another eNodeB 28, e.g., to eNodeB $28_4$. The distribution plan whose implementation is shown in FIG. 5 also includes directing eNodeB $28_4$ to distribute the software in parallel to two further nodes, e.g., to eNodeB $28_5$ and eNodeB $28_6$, as further examples of instances of act 5-4 and also as an example of tree-like distribution of the software.

Acts 5-3 as shown in FIG. 5 are specific examples of first radio base station eNodeB $28_1$ distributing the software to a first group or radio base stations (e.g., to second eNodeB $28_2$ and eNodeB $28_4$). Acts 5-4 of FIG. 5 are examples of the plural members of the first group of radio base stations (e.g., eNodeB $28_2$ and eNodeB $28_4$) in turn distributing the software to at least one other radio base station.

Thus, in some of its aspects including those of the FIG. 5 method and system, the technology maintains centralized software server control of the software versions and the licenses, but lets the eNodeB contribute in the software distribution using cascading.

In the present technology, control over software versions and licenses are still managed by an Operation Center or the like over a vendor-specific Management Interface. When need for software upgrade is identified, the new software is downloaded to the eNodeB. Depending on software availability, network infrastructure and neighbor base load, the software can be downloaded to the eNodeB from the most suitable source. In case of mass distribution of software an eNodeB can be order to redistribute the software to its neighbors.

The distribution of software from first radio base station eNodeB $28_1$ to other eNodeBs 28, such as second eNodeB $28_2$ and eNodeB $28_4$, as well as the distribution of software from the second tier eNodeBs $28_2$ and $28_4$ to further eNodeBs 28, occurs over X2-AP links 38 which connect or are otherwise used by the involved eNodeBs 28. Some modification of the X2 interface is required by the present technology to accommodate the software request message and software distribution described herein. In particular, in order to distribute software between eNodeBs, new X2 messages have to be defined for communications such as those of acts 4-5 and 4-6. Also, the new messages include messages related to file copying protocol, e.g. file request, signaling involved in the file transfer, revoke to the file request etc. In addition, the format of the files subjected to distribution needs synchronization. The proposed solution is to let this function handle distribution of generic files, all in order to make it possible to distribute software between eNodeBs in a multi vendor scenario.

It will be appreciated that software source server 36 and elements of one or more of the eNodeBs 28 involved in the software distribution can be accomplished using processors or controllers as those terms are expansively discussed herein.

The technology described herein advantageously eases load on a central software and license cluster (e.g., software source server 36), and potentially also network load on switches in core network 34 can be lessened. Easing load on the software source server can either speed up the software distribution in the mobile network, or reduce the necessary investment in the software and license cluster and thus save cost.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. As used herein, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention, for it to be encompassed hereby. Furthermore, no element, component, or method step in the present disclosure is intended to be dedicated to the public.

What is claimed is:

1. A method of operating a telecommunications network, the network comprising a software source server and plural radio base stations, the method comprising:

detecting an insufficient software situation for a target radio base station;

the software source server authorizing obtention of satisfactory software for the target radio base station a source radio base station target radio base station;

the target radio base station obtaining the satisfactory software from the source radio base station so that the software source server does not send the satisfactory software toward the target radio base station as a result of the insufficient software situation.

2. The method of claim 1, wherein the insufficient software situation is either a missing software situation or an upgrade-required software situation.

3. The method of claim 1, wherein detecting the insufficient software situation for the target radio base station is performed by the target radio base station.

4. The method of claim 1, further comprising the target radio base station requesting, of the software source server, resolution of the insufficient software situation.

5. The method of claim 1, further comprising:

the software source server directing the target radio base station to obtain the satisfactory software from the source radio base station;

the target radio base station requesting the satisfactory software from the source radio base station over an X2-AP interface;

the source radio base station supplying the satisfactory software to the target radio base station over the X2-AP interface.

6. A telecommunications network comprising:

a software source server;

plural radio base stations;

wherein, upon detection of an insufficient software situation for a target radio base station, the software source server is configured to authorize obtention of satisfactory software for the target radio base station from a source radio base station;

wherein the target radio base station is configured to obtain the satisfactory software from the source radio base station so that the software source server does not send the satisfactory software toward the target radio base station as a result of the insufficient software situation.

7. The system of claim 6, wherein the insufficient software situation is either a missing software situation or an upgrade-required software situation.

8. The system of claim 6, wherein the target radio base station is configured to detect the insufficient software situation for the target radio base station.

9. The system of claim 6, wherein the target radio base station is configured to request, of the software source server, resolution of the insufficient software situation.

10. The system of claim 6, wherein the software source server is configured to direct the target radio base station to obtain the satisfactory software from the source radio base station; wherein the target radio base station is configured to request the satisfactory software from the source radio base station over an X2-AP interface; and wherein the source radio base station is configured to supply the satisfactory software to the target radio base station over the X2-AP interface.

11. The method of claim 1, further comprising the target radio base station obtaining the satisfactory software from the source radio base station in response to an authorization message issued by the software source sever.

12. The system of claim 6, wherein target radio base station is configured to obtain the satisfactory software from the source radio base station in response to an authorization message issued by the software source sever.

* * * * *